United States Patent
Wang

(10) Patent No.: US 8,275,134 B2
(45) Date of Patent: Sep. 25, 2012

(54) METHOD FOR GUARANTEEING SECURITY OF CRITICAL DATA, TERMINAL AND SECURED CHIP

(75) Inventor: Zhuqiang Wang, Beijing (CN)

(73) Assignees: Lenovo (Beijing) Limited, Beijing (CN); Beijing Lenovo Software Ltd., Beijing (CN)

( * ) Notice: Subject to any disclaimer, the term of this patent is extended or adjusted under 35 U.S.C. 154(b) by 1089 days.

(21) Appl. No.: 12/023,107

(22) Filed: Jan. 31, 2008

(65) Prior Publication Data
US 2008/0181409 A1 Jul. 31, 2008

(30) Foreign Application Priority Data
Jan. 31, 2007 (CN) .......................... 2007 1 0063426

(51) Int. Cl.
*H04L 9/00* (2006.01)
(52) U.S. Cl. ...................................................... 380/277
(58) Field of Classification Search .................. None
See application file for complete search history.

(56) References Cited

U.S. PATENT DOCUMENTS

| | | | | |
|---|---|---|---|---|
| 7,602,909 | B1 * | 10/2009 | Shields ............................ | 380/42 |
| 7,647,499 | B2 * | 1/2010 | Blair et al. .................... | 713/168 |
| 2001/0025342 | A1 * | 9/2001 | Uchida ........................ | 713/186 |
| 2005/0257272 | A1 * | 11/2005 | Nakao ............................. | 726/26 |
| 2006/0072748 | A1 * | 4/2006 | Buer ............................... | 380/44 |
| 2008/0044023 | A1 * | 2/2008 | Zorea et al. .................... | 380/270 |
| 2009/0300368 | A1 * | 12/2009 | Zilberstein et al. ........... | 713/190 |

FOREIGN PATENT DOCUMENTS

| CN | 1422034 A | 6/2003 |
|---|---|---|
| CN | 1607511 A | 4/2005 |

\* cited by examiner

*Primary Examiner* — Kambiz Zand
*Assistant Examiner* — Teshome Hailu
(74) *Attorney, Agent, or Firm* — Patterson Thuente Christensen Pedersen, P.A.

(57) ABSTRACT

A method for guaranteeing the security of critical data, which is used in a terminal including a secured chip and includes the steps of: activating the secured chip by the terminal platform to receive cryptograph A of said critical data; parsing internally by the secured chip the cryptograph A with a preset key A to generate a plaintext, then encrypting said plaintext with a preset key B to generate cryptograph B, and returning the cryptograph B to the terminal platform. Since cryptograph conversion is performed inside the secured chip, and the process of converting the cryptograph A to the cryptograph B is completed inside the secured chip as a one-shot action, the secured chip cannot be eavesdropped upon or stolen by any vicious software, and thus the critical data is guaranteed to be always in a cryptograph status from the secured input device to the remote server, which ensures the security of the critical data. In addition, the present invention is low in cost, advantageous in spreading and application, and convenient in customization and upgrading. The present invention further provides a terminal and a secured chip.

14 Claims, 3 Drawing Sheets

METHOD FOR GUARANTEEING SECURITY OF CRITICAL DATA, TERMINAL AND SECURED CHIP

RELATED APPLICATION

The present application claims priority to Chinese Application No. 200710063426.1 filed Jan. 31, 2007, which is incorporated herein in its entirety by reference.

FIELD OF THE INVENTION

The present invention relates to the field of information security technology, and in particular to a method for guaranteeing the security of critical data, a terminal and a secured chip.

BACKGROUND

Issues on information security have been drawing more and more attention with the rapid development of information technology. It is essential to guaranteeing the security of critical data especially in such situations as electronic payment, stock exchange, user identity recognition and the like. The critical data herein includes card number, account number, password, information on transaction, SIN (subscriber identification number), fingerprint, etc.

Referring to FIG. 1 and taking as an example of electronic payment on a PC (Personal computer), the PC terminal transfers critical data acquired via a keyboard to a remote server over a network and requests for verification. The critical data is generally encrypted with a key recognizable to the server before being transferred to the remote server.

During the process of forwarding the critical data via the keyboard, however, the critical data presents in plaintext, and thus there is a risk of lacking security. As a counteract, a secured input device which refers to a device capable of encrypting information entered by a user, such as a keyboard, a card reader or any other device, each having an encryption function is needed. With such a secured input device, the critical data would be ensured to be encrypted before being forwarded.

Below, some known solutions of guaranteeing the security of critical data using a secured input device will be introduced by example of personal electronic payment.

(1) The secured input device holds the key of a remote server directly and encrypts critical data immediately after obtaining them, without any other processing conducted before the arrival of the critical data at the server.

Unfortunately, this solution entails that the secured input device has a powerful data processing capability, with which such functions as user certificate (key) writing and the like can be fulfilled. This is very difficult to implement for a secured input device since considerable modification on the input device is required. Moreover, a user usually has a secured input device first and then applies for a user certificate. The resulting problem is that such device has a lower producibility because there is a great difficulty in rewriting or overwriting the secured input device.

(2) Management and application software for the secured input device is installed on the PC platform, and information obtained from the secured input device is subject to cryptograph conversion by the software, that is, the information is first decrypted and then encrypted with a user certificate issued by the remote server.

This solution is implemented particularly in the following procedure: 1) the secured input device acquires and encrypts critical data to generate cryptograph A, and then transfers the cryptograph A to the PC terminal; 2) the PC terminal carries out cryptograph conversion using the management and application software for the secured input device, to be more specific, the PC terminal decrypts the cryptograph A to generate a plaintext, and then encrypts the plaintext with the user certificate provided by the remote server to generate cryptograph B; 3) finally, the PC terminal transfers the cryptograph B and the like over a network to the remote server for processing request.

The above cryptograph conversion is performed on an open OS (operating system), and the critical data may exist in plaintext. Therefore, such secured input will not make any difference if the management and application software has suffered attacks from any vicious software.

As can be concluded from the above introduction, the first solution is weak in terms of implementation, and the second solution, though being feasible, cannot sufficiently ensure the security of critical data.

SUMMARY OF THE INVENTION

The present invention discloses a method for guaranteeing the security of critical data, in order to overcome the problem with the existing solutions of poor practicability and security during the transmission of information obtained by a secured input device to a remote server. Meanwhile, the present invention also proposes a terminal guaranteeing the security of critical data and a secured chip.

To achieve the above object, the present invention provides the following technical solutions.

A method for guaranteeing the security of critical data is used in a terminal comprising a secured chip and comprises steps of: activating the secured chip by the terminal platform to receive cryptograph A of said critical data; parsing internally by the secured chip the cryptograph A with a preset key A to generate a plaintext, and then encrypting said plaintext with a preset key B to generate cryptograph B; and returning the cryptograph B to the terminal platform.

The method further comprises, after parsing by the secured chip the cryptograph A to generate a plaintext, checking said plaintext with a pre-stipulated format, and if the generated plaintext has a format consistent to the pre-stipulated format, encrypting said plaintext to generate the cryptograph B and returning the cryptograph B to the terminal platform, otherwise returning an indication of service rejection to the terminal platform.

The method further comprises determining by the secured chip whether the generated plaintext is within a pre-stored range of critical data, and encrypting the plaintext to generate the cryptograph B and return the cryptograph B to the terminal platform if the answer is yes, otherwise returning an indication of service rejection to the terminal platform.

Said key A is a private key of the secured chip. The method may further comprise: encrypting by the secured input device its own identification information with its own private key; encrypting the encrypted identification information and the acquired critical data with a public key corresponding to the key A to obtain the cryptograph A, and sending the cryptograph A to the terminal platform. The process of parsing the cryptograph A by the secured chip is: parsing the cryptograph A with the key A to obtain the encrypted identification information of the secured input device and critical data; parsing the identification information with the public key of the secured input device; determining whether the cryptograph A is sent by a legal secured input device.

Said key A is a symmetric key or a private key. The method further comprises: acquiring by the secured input device the critical data; encrypting the critical data either with a symmetric key stored by the secured input device and corresponding to said symmetric key or with a public key corresponding to said private key so as to generate the cryptograph A; and sending the cryptograph A to the terminal platform.

The method further comprises: generating randomly a serial number or a time stamp by the secured input device at the time of acquiring the critical data, and encrypting said serial number or said time stamp along with the critical data using said symmetric key or said public key so as to generate the cryptograph A; after parsing the cryptograph A to generate a plaintext, determining by said secured chip whether said plaintext is legal based on said serial number or said time stamp.

The method further comprises transferring the cryptograph B to a server by the terminal platform. Said key B is a symmetric key recognized by said server, a public key of said server or a user certificate issued by said server.

The method further comprises transferring the cryptograph B to a server by the terminal platform. Said key B comprises a user certificate issued by the server and a platform certificate. The process of encrypting by said secured chip the plaintext to generate the cryptograph B is encrypting the plaintext with the user certificate to generate first cryptograph and encrypting the first cryptograph with the platform certificate to generate the cryptograph B.

A terminal for performing security processing on critical data comprises a secured chip and an application platform. The application platform activates the secured chip to receive cryptograph A of said critical data, and receives cryptograph B returned by the secured chip. The secured chip pre-stores a key A used in parsing the cryptograph A and a key B and takes charge of parsing the cryptograph A with the key A into a plaintext, then generating cryptograph B with the key B and returning the cryptograph B to the application platform.

Said terminal further comprises a secured input device which comprises an input interface unit, an encryption unit and a control unit. The input interface unit receives the critical data and transfers to said encryption unit. The encryption unit pre-stores a key corresponding to said key A, encrypts data provided by the input interface unit with the key to generate the cryptograph A and provides the cryptograph A to said control unit. The control unit provides the cryptograph A from the encryption unit to the application platform. The secured input device further comprises a counter or a timestamp unit. The counter, after the input interface unit has acquired the critical data, generates a serial number and provides it together with the critical data to the encryption unit for further processing. The timestamp unit, after the input interface unit has acquired the critical data, generates a time mark and provides it together with the critical data to the encryption unit for further processing.

The secured input device further comprises a dedicated switching key which instructs the control unit to switch on or off the input interface unit.

A secured chip present in a terminal comprises an interface unit, a key pre-storage unit and a cryptograph conversion atomic unit. The interface unit receives cryptograph A from the terminal platform and returns cryptograph B to the terminal platform. The key pre-storage unit stores a key A and a key B. The cryptograph conversion atomic unit completes one-shot cryptograph conversion: parsing the cryptograph A with the key A to obtain a plaintext, and encrypting the plaintext with the key B to generate the cryptograph B.

The secured chip further comprises a data format comparison unit which pre-stores a plaintext format supported by the secured chip, compares the plaintext obtained by the cryptograph conversion atomic unit with the pre-stored format, and if they are consistent with each other, instructs the cryptograph conversion atomic unit to operate, otherwise instructs the interface unit to returns an error indication to the terminal platform.

The secured chip further comprises a replay attack prevention unit which records a history of the serial number or the time mark, compares the serial number or the time mark in the plaintext obtained by the cryptograph conversion atomic unit with the recorded serial number or time mark, and if they are consistent with each other, instructs the cryptograph conversion atomic unit to operate, otherwise instructs the interface unit to returns an error indication to the terminal platform.

The secured chip further comprises a critical data range presetting unit which pre-stores critical data supported by the secured chip, determines whether the plaintext obtained by the cryptograph conversion atomic unit is within the pre-stored critical data range, and if the answer is yes, instructs the cryptograph conversion atomic unit to operate, otherwise instructs the interface unit to return an error indication to the terminal platform.

As described above, with the present invention, cryptograph conversion is performed inside the secured chip, and the process of converting the cryptograph A to the cryptograph B is completed inside the secured chip as a one-shot action. Therefore, the secured chip cannot be eavesdropped upon or stolen by any vicious software, and thus the critical data is guaranteed to be always in a cryptograph status from the secured input device to the remote server, thus ensuring the security of the critical data.

In addition, the secured input device is not required to have a great data processing capability. The present invention can be implemented with only a structural improvement on any existing secured input device, which is low in cost, advantageous in spreading and application, and convenient in customization and upgrading.

DETAILED DESCRIPTION

Figure 1:
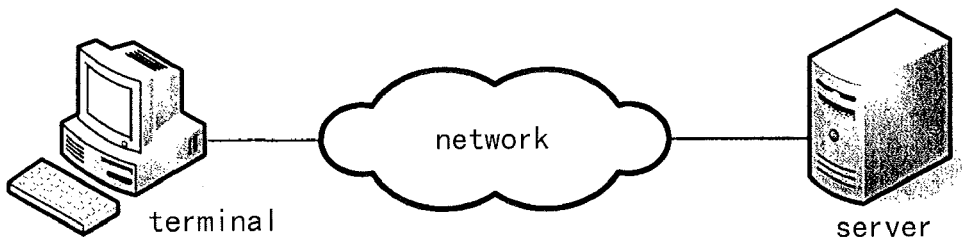
FIG. 1 is a schematic diagram of electronic payment in the prior art.

Certain embodiments of the present invention use a secured chip as the body in which cryptograph conversion is performed, and only a cryptograph form can be found outside the secured chip, which ensures that any critical data acquired by a secured input device can be transmitted to a remote server in a secured way.

Now, the first embodiment of the present invention will be elaborated upon.

Secured chips of this embodiment of the present invention have independent processors and memory units which can store keys and characteristic data as well as provide "atomic service" for cryptograph conversion. The so-called atomic service refers to service provided by a single body. With the atomic service of the secured chip, the conversion process of "cryptograph A->plaintext->cryptograph B" can be completed in a one-shot manner, and thus any plaintext form cannot be found outside the secured chip, that is, data remains in an encryption status even if being stolen.

Any secured chip having a separate atomic service can meet the requirement of the present invention. Also, the firmware of any existing secured chip can be extended, for example, the extension of TPM (Trusted Platform Module), to satisfy the requirement on a secured chip providing atomic service in the present invention.

Since the completion of cryptograph conversion inside the secured chip is a one-shot event, it is necessary to preset a key A for parsing cryptograph A and a key B for generating cryptograph B in the secured chip. Here, the cryptograph A is generated through the encryption of critical data by a secured input device, and accordingly the key A should be pre-stipulated with respect to the secured input device. The finally-generated cryptograph B is to be sent to a remote server, and accordingly tile key B should be recognizable by the server.

Encryption techniques are generally classified into two categories of "symmetric" and "asymmetric". Symmetric encryption means that the same key is used in both encryption and decryption. On the other hand, asymmetric encryption means that different keys are used respectively in encryption and decryption, and there usually exist two keys, one being called "public key" and the other being called "private key", which can open an encrypted file only when used in pairs. Here, a "public key" refers to a key that can be published to the outside, while a "private key" can be known only to a key holder. Digital signature is often employed in the asymmetric encryption technique to determine whether the identity of a sender is authentic. As an example, user A encrypts his or her signature with his or her own private key and attaches the signature to a mail. Then, he or she encrypts the entire mail with the public key of user B. Having received such cryptograph, user B decrypts the mail with his or her own private key to obtain user A's raw text and digital signature, and then decrypts the digital signature with user A's public key. In this way, security on both parties can be guaranteed.

The above symmetric encryption, asymmetric encryption and digital-signature-based asymmetric encryption each can be employed in the process of encrypting critical data to generate cryptograph A by the secured input device as well as in the process of encrypting the obtained plaintext to generate cryptograph B by the secured chip according to one embodiment of the present invention. Especially during the process of generating the cryptograph B by the secured chip, the plaintext can be encrypted directly with a user certificate issued by the remote server or with the combination of the user certificate and a platform certificate, and the latter method provides double security for critical data. Here, the user certificate is directed to a user, and the platform certificate to a terminal (e.g., PC) where the secured chip is located.

Figure 2:
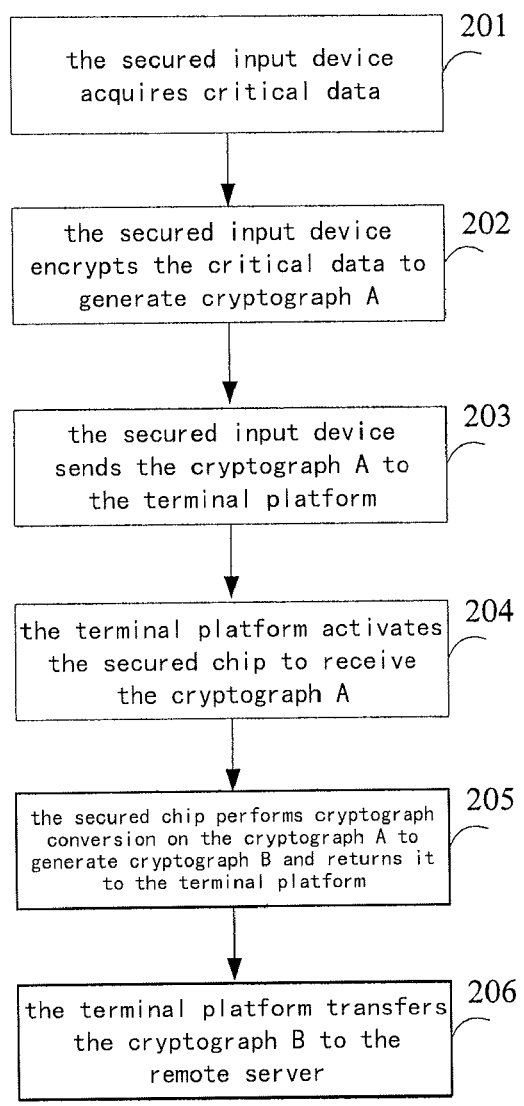
FIG. 2 is a flowchart of one embodiment of a method according to the present invention.

Referring to FIG. 2, which is a flowchart of the first embodiment, the first embodiment comprises:

Step 201: the secured input device acquires critical data;

Step 202: the secured input device encrypts the critical data with a symmetric key, an asymmetric key or a digital-signature-based asymmetric key to generate cryptograph A;

Step 203: the secured input device sends the cryptograph A to the terminal platform, in particular the management and application software for the secured input device;

Step 204: the terminal platform activates the secured chip to receive the cryptograph A;

Step 205: the secured chip starts atomic service to perform cryptograph conversion on the cryptograph A, generates cryptograph B and return it to the terminal platform;

Step 206: the terminal platform transfers the cryptograph B via the secured HTTPS protocol to the remote server.

In step 202, asymmetric encryption is employed in such a manner that the secured input device encrypts the critical data with the public key of the secured chip, and thus the secured chip can decrypt the critical data with its own private key. If digital-signature-based asymmetric encryption is used in step 202, the specific process is that the secured input device encrypts its own identification information with its own private key, encrypts the encrypted identification information and the acquired critical data with the public key of the secured chip to generate the cryptograph A, and then send the cryptograph A to the terminal platform. Accordingly, the secured chip parses the cryptograph A in such a manner that it first parses the cryptograph A with the key A to obtain the encrypted identification information of the secured input device and critical data, and then parses the identification information with the public key of the secured input device so as to determine whether the cryptograph A is sent by a legal secured input device. Similarly to the above described, the secured chip encrypts the obtained plaintext to generate the cryptograph B in step 205.

As described above, since cryptograph conversion is performed inside the secured chip, and the process of converting the cryptograph A to the cryptograph B is completed inside the secured chip as a one-shot action, the secured chip cannot be eavesdropped upon or stolen by any vicious software, and thus the critical data is guaranteed to be always in a cryptograph status from the secured input device to the remote server, which ensures the security of the critical data. The encryption processing on the critical data by the secured input device prevents any Trojan-horse eavesdropping, and the use of HTTPS by the terminal platform prevents any fishing website or any network eavesdropping. To be more important, the critical data always appears in the form of a cryptograph throughout the whole transmission process and thus cannot be parsed even if stolen. The dual authentication of both user identity and platform identity guarantees that any transaction cannot be denied unilaterally.

Below, a detailed description will be given of the second embodiment.

The method of the present invention is optimized on the basis of the above first embodiment, in particular by adding such measures as checking by the secured chip on the information inputted via the secured input device, preventing a replay attack, processing only the preset critical data, etc. Here, all or any one of these optimization schemes can be implemented.

A packet format may be pre-stipulated between the secured chip and the secured input device, in order to ensure the legality of the information to be processed by the secured chip. After parsing the cryptograph A and obtaining the plaintext, the secured chip first checks the plaintext with the pre-stipulated packet format, and if the check succeeds, encrypts the plaintext to generate the cryptograph B and returns it to the terminal platform. If the check fails, the secured chip determines that the plaintext is illegal and conducts no processing and returns an error indication to the terminal platform.

The so-called replay attack is a type of indirect attack, that is, it is unnecessary for an invader to decrypt any password, what he or she needs is to reprogram the client software so as to realize system logon or data theft with the password. In the present invention, the replay attack refers to applying the stolen cryptograph A directly to the secured chip to seek a result. In order to prevent such an attack and achieve higher security, the following process is performed: adding a serial number or a timestamp randomly when the critical data is acquired by the secured input device, and encrypting the serial number or the timestamp along with the critical data to generate the cryptograph A; after parsing and obtaining the plaintext on the secured chip end, comparing the serial number or the timestamp with a history record to determine whether a replay attack occurs.

Alternatively, a set of critical data, which can be processed, can be preset in the secured chip. For example, a set of card numbers can be preset, and any card number not within the set will be excluded from processing. In this way, the security can also be enhanced.

Figure 3:
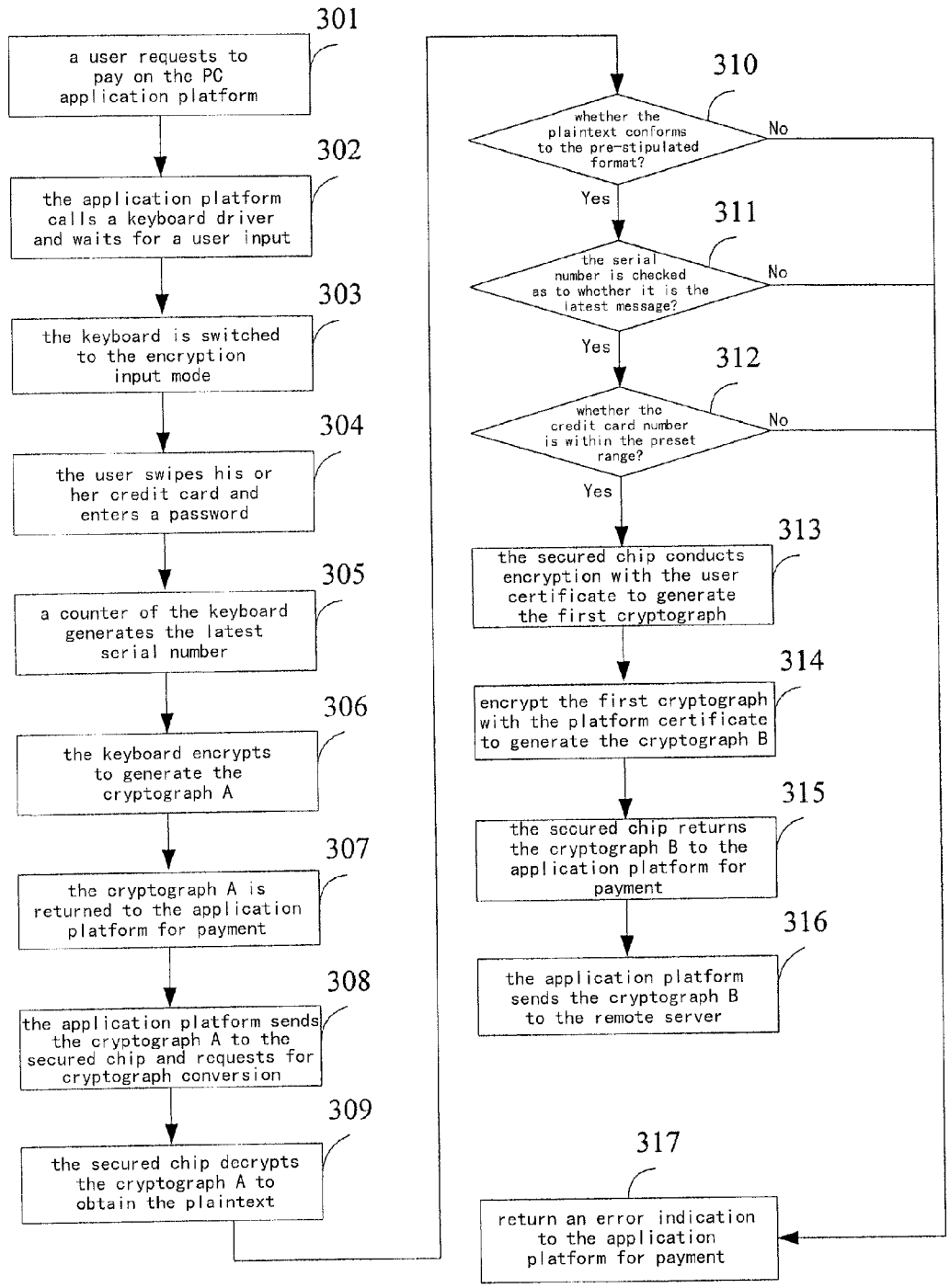
FIG. 3 is a flowchart of another embodiment of a method according to the present invention.

Hereafter, the flow of the second embodiment will be specifically explained taking personal payment as an example, in which the terminal is a PC, the secured input device is a password keyboard which has a card-swiping slot and can switch between a normal mode and an encryption mode. Referring to FIG. 3, the flow comprises:

Step 301: a user requests to pay on the PC application platform;

Step 302: the application platform for personal payment calls a keyboard driver and waits for a user input;

Step 303: the keyboard is switched to the encryption input mode;

Step 304: the user swipes his or her credit card and enters a password;

Step 305: a counter of the keyboard generates the latest serial number;

Step 306: the keyboard encrypts the card number, the password and the serial number with a preset key to generate the cryptograph A;

Step 307: the cryptograph A is returned to the application platform for payment;

Step 308: the application platform for payment sends the cryptograph A to the secured chip and requests cryptograph conversion;

Step 309: the secured chip decrypts the cryptograph A with the preset key A to obtain the plaintext;

Step 310: it is determined as to whether the plaintext conforms to the pre-stipulated packet format, and the flow advances to step 311 if it conforms, otherwise the flow turns to step 317;

Step 311: the serial number is checked and determined as to whether it is the latest message, and the flow proceeds to step 312 if it is, otherwise the flow turns to step 317;

Step 312: it is determined as to whether the credit card number in the plaintext is within the preset set of card numbers, and the flow advances to step 313 if it is, otherwise the flow turns to step 317;

Step 313: the secured chip conducts encryption with the user certificate issued by the server to generate the first cryptograph;

Step 314: the secured chip encrypts the first cryptograph with the platform certificate issued by the server to generate the cryptograph B;

Step 315: the secured chip returns the cryptograph B to the application platform for payment;

Step 316: the application platform for payment sends the cryptograph via the secured HTTPS protocol to the remote server;

Step 317: the secured chip refuses to provide service and returns an error indication to the application platform for payment.

The above second embodiment is an improvement on the method of the first embodiment of the present invention, in which the security of critical data is further heightened by such measures as checking by the secured chip on the information inputted via the secured input device, preventing a replay attack, processing only the preset critical data, etc.

Figure 4:
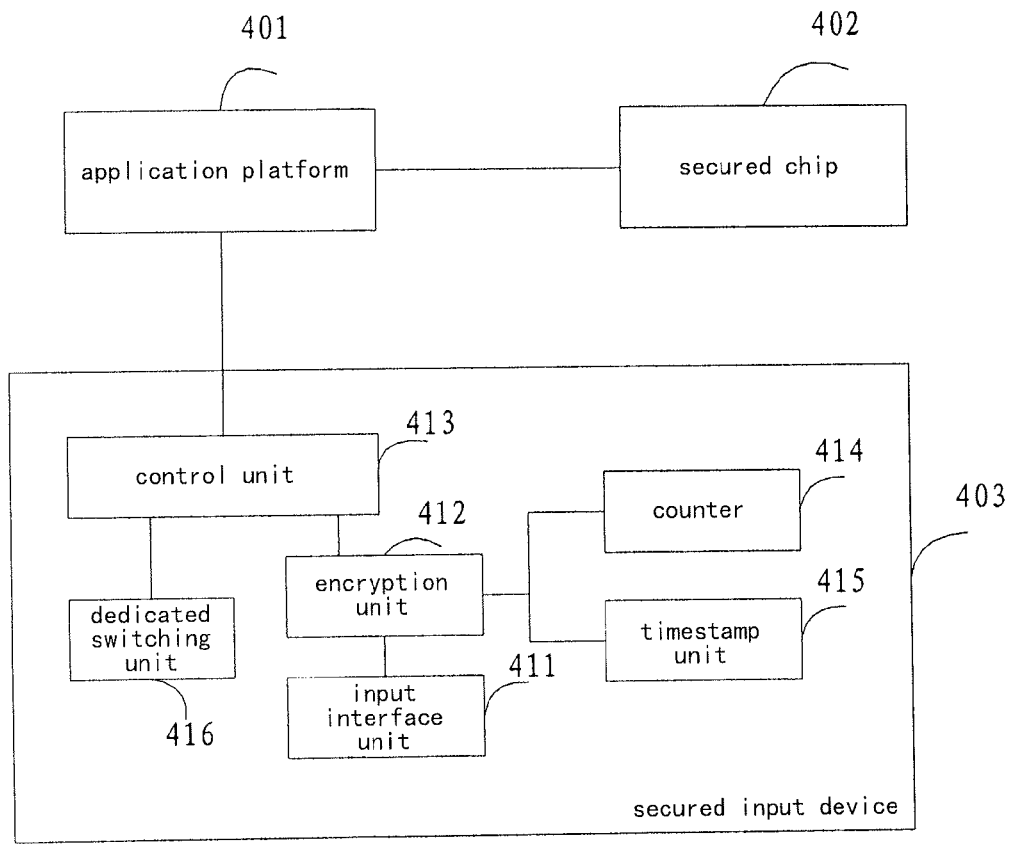
FIG. 4 is a schematic block diagram of a terminal according to one embodiment of the present invention.

FIG. 4 shows a terminal of the present invention, which is capable of security processing on critical data to guarantee the security of critical data before the sending to a remote server.

The terminal comprises an application platform 401 and a secured chip 402, in addition to those functional components indispensable to a general terminal. The application platform 401 activates the secured chip 402 to receive cryptograph A obtained from the encryption of critical data as well as receives cryptograph B returned from the secured chip 402. The secured chip 402 stores an encryption key A for parsing the cryptograph A and an encryption key B in advance as well as provides atomic service to finish the cryptograph conversion in such a manner that it first parses the cryptograph A into a plaintext with the key A, generates cryptograph B with the key B and then returns the cryptograph B to the application platform 401, which communicates with the secured chip 402. The communication may be via TSS (Thinkor Security Service) communication. After obtaining the cryptograph B, the application platform 401 sends it to the remote server via a secured protocol like HTTPS.

The terminal further includes a secured input device 403, i.e., an input device having an encryption function. Referring to FIG. 4, the secured input device 403 includes an input interface unit 411, an encryption unit 412 and a control unit 413. The input interface unit 411 receives critical data and transfers it to the encryption unit 412. The encryption unit 412 stores a key corresponding to the key A in advance, encrypts the critical data provided by the input interface unit 411 with the key to generate the cryptograph A and provides it to the control unit 413, which in turn provides the cryptograph A acquired from the encryption unit 412 to the application platform 401 via the driver for the secured input device. The input interface unit 411 can be a card-swiping slot, a keyboard, a fingerprint recognizer or the like.

Preferably, the secured input device 403 also includes a counter 414 or a timestamp unit 415 for replay attack prevention. After the input interface unit 401 has acquired the critical data, the counter 414 generates a serial number and provides it along with the critical data to the encryption unit 412 for further processing. The timestamp unit 415, after the input interface unit 401 has acquired the critical data, generates a time mark and provides it along with the critical data to the encryption unit 412 for further processing. The secured input device 403 further includes a dedicated switching key 416 which can instruct the control unit 413 to switch on or off the input interface unit 411. With such a dedicated switching key 416, a general input device can be modified in a simple way: entering an encryption input mode when the dedicated switching key 416 is pressed, otherwise entering a general input mode.

With the terminal of the present invention, the secured input device is not required to have a great data processing capability. The present invention can be implemented with only a structural improvement on any existing secured input device, which is low in cost, advantageous in spreading and application, and convenient in customization and upgrading.

Figure 5:
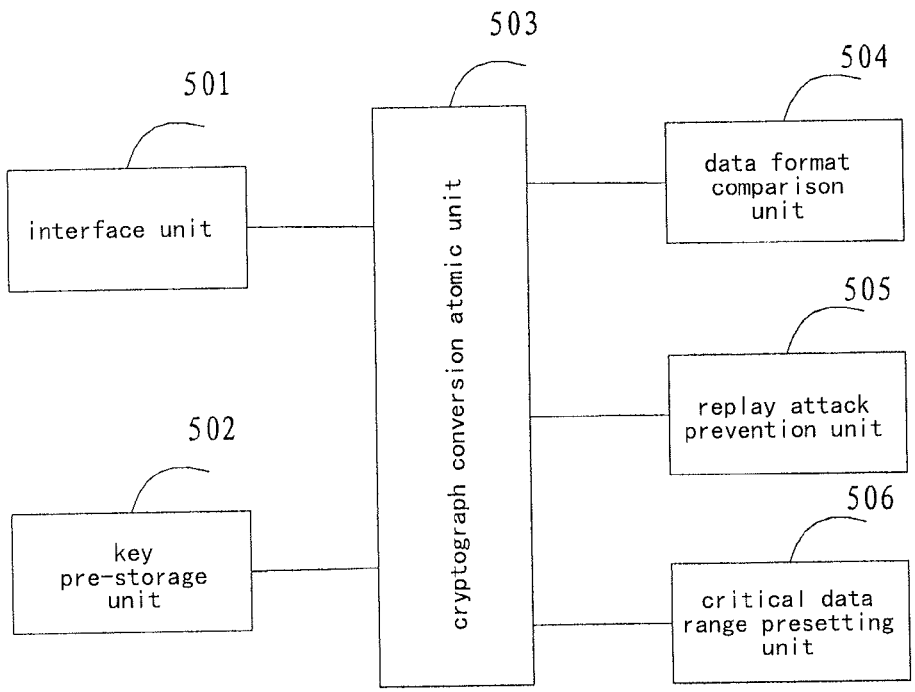
FIG. 5 is a schematic block diagram of a secured chip according to one embodiment of the present invention.

Now referring to FIG. 5, one embodiment of the secured chip 402 of the present invention is shown. The secured chip 402 is located in the terminal and provides atomic service to fulfill cryptograph conversion in a one-shot manner. As shown in FIG. 5, the secured chip 402 includes an interface unit 501, a key pre-storage unit 502 and a cryptograph conversion atomic unit 503.

The interface unit 501 receives the cryptograph A from the terminal platform and also returns the cryptograph B to the terminal platform. The key pre-storage unit 502 stores the keys A and B. The cryptograph conversion atomic unit 503 is configured to complete the cryptograph conversion in a one-shot manner, that is, to parse the cryptograph A with the key A to obtain the plaintext, and then to encrypt the plaintext with the key B to generate the cryptograph B. A symmetric key or asymmetric key, or a user certificate provided by the server or the combination of a user certificate and a platform certificate can be employed in the process of encrypting the plaintext to generate the cryptograph B, and the specific steps are the same as those described in the above method embodiments, therefore the details thereof will not be repeated.

Preferably, the secured chip 402 further comprises a data format comparison unit 504 which pre-stores a plaintext (message) format supported by the secured chip 402, compares the plaintext obtained by the cryptograph conversion atomic unit 503 with the pre-stored format, and if they are consistent to each other, instructs the cryptograph conversion atomic unit 503 to operate, otherwise instructs the interface unit 501 to return an error indication to the terminal platform.

In one embodiment, the secured chip 402 further comprises a replay attack prevention unit 505 which records a history of the serial number or the time mark, and which compares the serial number or the time mark in the plaintext obtained by the cryptograph conversion atomic unit 503 with the recorded serial number or time mark, and if they are not consistent with each other, instructs the cryptograph conversion atomic unit 503 to operate, otherwise instructs the interface unit 501 to returns an error indication to the terminal platform.

In one embodiment, the secured chip 402 further comprises a critical data range presetting unit 506 which pre-stores critical data supported by the secured chip 402, determines whether the plaintext obtained by the cryptograph conversion atomic unit 503 is within the pre-stored critical data range, and if the answer is yes, instructs the cryptograph conversion atomic unit 503 to operate, otherwise instructs the interface unit 501 to returns an error indication to the terminal platform.

The foregoing description is intended to illustrate various embodiments of the present invention. It should be noted that, for those ordinarily skilled in the art, various improvements and refinements can be made within the principle of the present invention and thus should be construed as belonging to the scope of the present invention.

What is claimed is:

1. A method for guaranteeing security of critical data, said wherein method is used in a terminal comprising a secured chip, an application platform, and a secured input device, and wherein said method comprises:
activating the secured chip by the application platform to receive encrypted critical data with key A;
parsing internally, by the secured chip, the encrypted critical data with key A with a preset key A to generate a plaintext, then encrypting said plaintext with a preset key B to generate encrypted critical data with key B, and returning the encrypted critical data with key B to the application platform, wherein the preset key A and the preset key B are stored in the security chip;
wherein said key A is a private key of the secured chip, said method further comprises:
encrypting by the secured input device its own identification information with its own private key; encrypting the encrypted identification information and acquired critical data with a public key corresponding to the key A to obtain the encrypted critical data with key A, and sending the encrypted critical data with key A to the application platform; and
the process of parsing the encrypted critical data with key A by the secured chip comprises:
parsing the encrypted critical data with key A with the preset key a to obtain the encrypted identification information of the secured input device and critical data; parsing the identification information with the public key of the secured input device; and determining whether the secured input device is a legal secured input device.

2. The method for guaranteeing security of critical data according to claim 1, further comprising:
after parsing the encrypted critical data with key A to generate a plaintext, checking by the secured chip said plaintext with a pre-stipulated format, and if the generated plaintext has a format consistent to the pre-stipulated format, encrypting said plaintext to generate the encrypted critical data with key B and returning the encrypted critical data with key B to the application platform, otherwise returning an indication of service rejection to the application platform.

3. The method for guaranteeing security of critical data according to claim 1, further comprising:
determining by the secured chip whether the generated plaintext is within a pre-stored range of critical data, and encrypting the plaintext to generate the encrypted critical data with key B and returning the encrypted critical data with key B to the application platform if the answer is yes, otherwise, returning an indication of service rejection to the terminal platform.

4. The method for guaranteeing security of critical data according to claim 1, wherein said key A is a symmetric key or a private key, and said method further comprises:
acquiring by the secured input device the critical data; encrypting the critical data either with a symmetric key stored by the secured input device and corresponding to said symmetric key or with a public key corresponding to said private key so as to generate the encrypted critical data with key A; and sending the encrypted critical data with key A to the application platform.

5. The method for guaranteeing security of critical data according to claim 4, further comprising:
generating randomly a serial number or a timestamp by the secured input device at the time of acquiring the critical data, and encrypting said serial number or said timestamp along with the critical data using said symmetric key or said public key so as to generate the encrypted critical data with key A;
after parsing the encrypted critical data with key A to generate a plaintext, determining by said secured chip whether said plaintext is legal based on said serial number or said timestamp.

6. The method for guaranteeing security of critical data according to claim 1, wherein said method further comprises transferring the encrypted critical data with key B to a server by the application platform, and
said key B is a symmetric key recognized by said server, a public key of said server or a user certificate issued by said server.

7. The method for guaranteeing security of critical data according to claim 1, wherein said method further comprises transferring the encrypted critical data with key B to a server by the application platform;

said key B comprises a user certificate issued by the server and a platform certificate; and the process of encrypting by said secured chip the plaintext to generate the encrypted critical key B consists of encrypting the plaintext with the user certificate to generate first cryptograph and encrypting the first cryptograph with the platform certificate to generate the encrypted critical data with key B.

8. A terminal for performing security processing on critical data, comprising a secured chip, a secured input device and an application platform, wherein:

said application platform activates the secured chip to receive encrypted critical data with key A, and receives encrypted critical data with key B returned by said secured chip; and said secured chip pre-stores a key A used in parsing the encrypted critical data with key A and a key B and takes charge of parsing the encrypted critical data with key A with the key A into a plaintext, then generating encrypted critical data with key B with the key B and returning the encrypted critical data with key B to said application platform;

wherein said key A is a private key of the secured chip, the secured input device comprises an input interface unit, an encryption unit and a control unit, said input interface unit receives the critical data and transfers to said encryption unit;

said encryption unit encrypts the secured input device's identification information with its own private key, encrypts the encrypted identification information and the critical data with a public key corresponding to the key A to obtain the encrypted critical data with key A, and sends the encrypted critical data with key A to said control unit;

said control unit provides the encrypted critical data with key A from the encryption unit to the application platform;

the secured chip parses the encrypted critical data with key A by parsing the encrypted critical data with key A with the preset key A to obtain the encrypted identification information of the secured input device and critical data, parsing the identification information with the public key of the secured input device, and determining whether the secured input device is a legal secured input device.

9. The terminal according to claim 8, wherein said secured input device further comprises a counter or a timestamp unit, wherein:

said counter, after the input interface unit has acquired the critical data, generates a serial number and provides it together with the critical data to said encryption unit for processing; and said timestamp unit, after the input interface unit has acquired the critical data, generates a time mark and provides it together with the critical data to said encryption unit for processing.

10. The terminal according to claim 8, wherein said secured input device further comprises a dedicated switching key which instructs said control unit to switch on or off said input interface unit.

11. A secured chip located in a terminal and comprising an interface unit and a key pre-storage unit, said secured chip further comprising a cryptograph conversion atomic unit, wherein:

said interface unit receives encrypted critical data with key A from an application platform comprised in said terminal and returns encrypted critical data with key B to said application platform;

said key pre-storage unit stores a key A and a key B; and said cryptograph conversion atomic unit completes one-shot cryptograph conversion: parsing the encrypted critical data with key A with the key A to obtain a plaintext, and encrypting the plaintext with the key B to generate the encrypted critical data with key B;

wherein said key A is a private key of the secured chip, the terminal further comprises a secured input device that encrypts its own identification information with its own private key, encrypts the encrypted identification information and acquired critical data with a public key corresponding to the key A to obtain the encrypted critical data with key A, and sends the encrypted critical data with key A to the application platform; and said cryptograph conversion atomic unit parses the encrypted critical data with key A by parsing the encrypted critical data with key A with the preset key A to obtain the encrypted identification information of the secured input device and critical data; parsing the identification information with the public key of the secured input device; determining whether the secured input device is a legal secured input device.

12. The secured chip according to claim 11, further comprising a data format comparison unit which pre-stores a plaintext format supported by the secured chip, compares the plaintext obtained by the cryptograph conversion atomic unit with the pre-stored format, and if they are consistent with each other, instructs the cryptograph conversion atomic unit to operate, otherwise instructs the interface unit to returns an error indication to the application platform.

13. The secured chip according to claim 11, further comprising a replay attack prevention unit which records a history of the serial number or the time mark, compares the serial number or the time mark in the plaintext obtained by the cryptograph conversion atomic unit with said recorded serial number or time mark, and if they are not consistent with each other, instructs the cryptograph conversion atomic unit to operate, otherwise instructs the interface unit to return an error indication to the application platform.

14. The secured chip according to claim 13, further comprising a critical data range presetting unit which pre-stores critical data supported by the secured chip, determines whether the plaintext obtained by the cryptograph conversion atomic unit is within the pre-stored critical data range, and if the answer is yes, instructs the cryptograph conversion atomic unit to operate, otherwise instructs the interface unit to return an error indication to the application platform.

* * * * *